United States Patent [19]

Buongiorno et al.

[11] Patent Number: 5,928,798
[45] Date of Patent: Jul. 27, 1999

[54] MULTI-LAYER POLYOLEFIN FILM CONTAINING RECYCLE POLYMER FROM CROSS-LINKED FILMS

[75] Inventors: Livio Buongiorno, Naviglio; Paolo Ciocca, Lumellogno, both of Italy

[73] Assignee: Cryovac, Inc., Duncan, S.C.

[21] Appl. No.: 08/715,114

[22] Filed: Sep. 18, 1996

Related U.S. Application Data

[62] Division of application No. 08/427,549, Apr. 20, 1995, Pat. No. 5,605,660.

[30] Foreign Application Priority Data

Apr. 28, 1994 [EP] European Pat. Off. .............. 94106672

[51] Int. Cl.$^6$ ........................... B29B 17/00; B29C 35/08; B29C 35/10
[52] U.S. Cl. ........................ 428/515; 428/411.1; 428/500
[58] Field of Search ................................ 428/515, 411.1, 428/500, 35.2, 35.7

[56] References Cited

U.S. PATENT DOCUMENTS

| | | | |
|---|---|---|---|
| 3,022,543 | 2/1962 | Baird, Jr. et al. ............................. | 18/57 |
| 3,741,253 | 6/1973 | Brax et al. ............................... | 138/137 |
| 3,821,182 | 6/1974 | Baird, Jr. et al. ........................ | 260/91 |
| 4,048,428 | 9/1977 | Baird, Jr. et al. ........................ | 526/343 |
| 4,086,297 | 4/1978 | Rei et al. ................................ | 524/330 |
| 4,123,584 | 10/1978 | Brewton ................................ | 428/379 |
| 4,188,350 | 2/1980 | Vicik et al. ............................ | 525/232 |
| 4,188,443 | 2/1980 | Mueller et al. ........................ | 428/216 |
| 4,194,039 | 3/1980 | Mueller ................................ | 428/213 |
| 4,229,241 | 10/1980 | Mueller ................................ | 156/243 |
| 4,234,663 | 11/1980 | Catte et al. ............................ | 428/517 |
| 4,274,900 | 6/1981 | Mueller et al. ........................ | 156/229 |
| 4,352,844 | 10/1982 | Bornstein ................................ | 428/35 |
| 4,353,967 | 10/1982 | Hungerford ............................ | 428/520 |
| 4,532,189 | 7/1985 | Mueller ................................ | 428/516 |
| 4,533,510 | 8/1985 | Nissel ................................ | 264/171 |
| 4,551,380 | 11/1985 | Schoenberg ............................ | 428/218 |
| 4,668,571 | 5/1987 | Moriarty, Jr. ............................ | 428/327 |
| 4,705,708 | 11/1987 | Briggs et al. ............................ | 428/35 |
| 4,755,419 | 7/1988 | Shah ........................................ | 428/220 |
| 4,756,858 | 7/1988 | Reifehauser et al. ...................... | 264/37 |
| 4,780,258 | 10/1988 | Cloeren ................................ | 264/171 |
| 4,837,075 | 6/1989 | Dudley ................................ | 428/220 |
| 4,846,359 | 7/1989 | Baird et al. ............................ | 215/12.2 |
| 4,865,902 | 9/1989 | Golike et al. ............................ | 428/215 |
| 4,877,682 | 10/1989 | Sauers et al. ............................ | 428/412 |
| 4,885,119 | 12/1989 | Mueller et al. ............................ | 264/22 |
| 5,066,443 | 11/1991 | Cloeren ................................ | 264/171 |
| 5,128,212 | 7/1992 | Kneale et al. ............................ | 428/516 |
| 5,306,745 | 4/1994 | Herran et al. ............................ | 523/205 |
| 5,605,660 | 2/1997 | Buongiorno et al. .................... | 264/456 |
| 5,747,594 | 5/1998 | deGroot et al. ........................ | 525/240 |
| 5,773,106 | 6/1998 | deGroot et al. ........................ | 428/35.7 |
| 5,792,534 | 8/1998 | deGroot et al. ........................ | 428/36.92 |

FOREIGN PATENT DOCUMENTS

| | | |
|---|---|---|
| 0 071 349 | 7/1982 | European Pat. Off. . |
| 0 314 907 | 9/1988 | European Pat. Off. . |
| 1524732 | 4/1968 | France . |
| 3239526 | 4/1984 | Germany . |
| 56-106939 | 1/1980 | Japan . |
| 56-146754 | 4/1980 | Japan . |
| 55-135613 | 10/1980 | Japan . |
| 157008114 | 1/1982 | Japan . |
| 2163097 | 6/1985 | United Kingdom . |

*Primary Examiner*—Robert H. Harrison
*Attorney, Agent, or Firm*—Mark B. Quatt

[57] ABSTRACT

A process for the manufacture of a multilayer cross-linked, heat-shrinkable, polyolefin film, said film having at least one inner layer comprising thermo-plastic polymer sandwiched between two outer layers comprised of thermoplastic polymer different from the thermoplastic polymer of said inner layer, comprising the steps of a) coextruding the materials into a tape;

b) cross-linking it;

c) converting said cross-linked tape into a heat-shrinkable film by orientation;

characterized in that scrap material produced in the manufacture or in the further processing to finished articles of cross-linked films of this same structure is incorporated by recycling it into said step a) in an amount up to 50% by weight of the total film weight.

1 Claim, No Drawings

MULTI-LAYER POLYOLEFIN FILM CONTAINING RECYCLE POLYMER FROM CROSS-LINKED FILMS

This application is a divisional of Ser. No. 08/427,549 filed Apr. 20, 1995 U.S. Pat. No. 5,605,660.

FIELD OF THE INVENTION

The present invention relates to a process of manufacturing heat shrinkable films particularly to the recycling of film scraps in the manufacture of said films.

BACKGROUND OF THE INVENTION

The manufacture of heat-shrinkable films is well known in the art.

As heat-shrinkable film, the expert in the field means a polymeric film which has the ability to shrink or, if restrained from shrinking, to generate shrink tension within the film.

Heat-shrinkable films are well known in the art and their main field of application is package of food and non-food goods.

The term "film" identifies a flexible thermoplastic sheet with a typical thickness of from about 10 microns to about 150 microns and preferably of from about 12 to about 100 microns. When a packaging film to be used as such in a packaging machine is meant, it will typically have a thickness of from about 10 to about 50 microns and preferably of from about 12 to about 35 microns, while when the film has first to be heat-sealed to itself, converted into a flexible thermoplastic container and then used in a packaging machine in the form of a bag or a pouch where the good to be packaged is introduced, it will have typically a thickness of from about 50 to about 150 microns preferably of from about 50 to about 100 microns.

Heat-shrinkable films typically have a multi-layered structure comprising olefinic polymers and/or copolymers of various kind, and the terms "polymer" or "polymeric resin", as herein used, generally include homopolymers, copolymers, terpolymers, block polymers, graft polymer, random polymers and alternate polymers.

The manufacture of the above films may generally be accomplished by extrusion (for single layer films) or coextrusion (for multi-layer films) of thermoplastic resinous materials which have been heated to their flow or melting point from one extrusion or coextrusion die in, for example, either tubular or planar (sheet) form. After a post-extrusion quenching to cool by well known systems the relatively thick extrudate is then reheated to a temperature within its orientation temperature range, generally below the crystalline melting point but above the second order transition temperature (glass transition point).

The terms "orientation" or "oriented" are used herein to generally describe the process step and resultant product characteristics obtained by stretching and immediately cooling a resinous thermoplastic polymeric material, which has been heated to an orientation temperature range so as to revise the molecular configuration of the material by physical alignment of the crystallites and/or molecules of the material in order to modify certain mechanical properties to the desired properties, for example shrink tension and orientation release stress.

The term "oriented" is also used herein interchangeably with the term "heat-shrinkable". An oriented (i.e. heat-shrinkable) material will tend to return to its unstretched (unextended) dimension when heated to an appropriate elevated temperature.

In the basic process for manufacturing the film as above, the film, once extruded (or coextruded, whenever the case) and initially cooled by, for example, cascade water or chill roll quenching, is then reheated to within its orientation temperature range and oriented by stretching. When the stretching force is applied in one direction, uniaxial orientation results. When the stretching force is applied in two directions, biaxial orientation results. The stretching to orient may be accomplished in many ways such as for example by "blown bubble" techniques or "tenter framing". These processes are well-known to those skilled in the art and refer to orientation procedures whereby the material is stretched in the cross or transverse direction (TD) and/or in the longitudinal or machine direction (MD). After being stretched, the film is rapidly cooled while substantially retaining its stretched dimension and thus set or lock-in the oriented (aligned) molecular configuration.

After setting the stretch-oriented molecular configuration, the film may then be stored in rolls and utilized to tightly package a wide variety of items.

The above general outline of manufacturing of films is not meant to be all inclusive, since such processes are well-known to the expert in the art. Examples of these processes are disclosed in Italian patent n. 1163118 and U.S. Pat. No. 4551380, both in the name of the applicant; said patents also refers to a number of documents relating to the prior art, for example U.S. Pat. Nos. 4,274,900; 4,229,241; 4,194,039; 4,188,443; 4,048,428; 3,821,182; 3,022,543.

Furthermore, when certain characteristics of the film are to be improved, the polymeric structure may be modified in a well-known way. In particular cases, cross-linking of the polymeric structure can be performed, for example by irradiation or chemically. A general disclosure of cross-linking can be found, among others, in U.S. Pat. No. 4,551,380, assigned to the applicant, issued Nov. 5, 1985.

Cross-linked multi-layered heat shrinkable films are there disclosed and claimed.

Generally, a considerable amount of scrap is generated in the course of the manufacture of heat-shrinkable films, such scraps coming from trimming from roll ends, film breakages, filling custom orders requesting special width, or rolls out of specification. In the tenter frame biaxial orientation step, considerable scraps come also from trimming the film edges in the transversal direction.

Such amount of scraps represents an economical burden and a heavy environmental problem due to the waste of plastic material.

A method of recycling coextruded scraps is disclosed in U.S. Pat. No. 4,877,682, assigned to Amoco Corporation, issued October 31, 1989. This patent discloses laminates containing scraps and further discloses articles of manufacture, particularly cookware. The patent relates to thermoplastic materials, which must have particular characteristics as to stiffness and heat-resistance. Among the many exemplary layer materials, polyolefins are cited, particularly crystalline polypropylene, crystalline polyethylene of low, medium, preferably high density. Crystalline polypropylene is said to be particularly preferred because of its high use temperature. The laminates herein disclosed must be capable of resisting deformation or deflection at cooking temperature. Therefore the background of this patent is distant from the one of the present invention which relates to heat-shrinkable films for packaging use.

The International Application WO 91/17886, in the name of E. I. Dupont De Nemours, published Nov. 28, 1991, discloses a multi-layer heat-shrinkable polymeric film containing recycle polymer.

This document claims a process of coextruding a multi-layer heat-shrinkable film having at least a core layer of thermoplastic polymer sandwiched between two outer layers and coextruding recycle of said film into said core along with said thermoplastic polymer of said core. On p. 2, 1. 30, of WO 91/17886iit is clearly stated that radiation involved in making particular heat-shrinkable films prevents scrap from the film from being recycled by melt processing, e.g. extrusion. This teaching is repeated on p. 8, 1. 22, as the scrap must be melt processable, hence the original heat shrinkable film from which the scrap was obtained must be free of crosslinking, such as from radiation, which would prevent melt processing.

Definitions

In the present description, unless specifically set forth and defined or otherwise limited, the terms "polymer" or "polymer resin" generally include, but are not limited to, homopolymers, copolymers, such as, for example, block, graft, random and alternating copolymers, terpolymers etc. and blends and modifications thereof. Furthermore, unless otherwise specifically limited, the terms "polymer" or "polymer resin" shall include all possible symmetrical structure of the material. These structures includes, but are not limited to, isotactic, syndiotactic and random symmetries.

The terms "melt flow" as used herein is the amount, in grams, of a thermoplastic resin which can be forced through a given orifice under a specified pressure and temperature within ten minutes, pursuant to ASTM D 1238–79. The term "melt flow index" as used herein is the amount, in grams, of a thermoplastic resin which can be forced through a given orifice under a specified pressure and temperature within ten minutes, pursuant to condition E of ASTM D 1238–79.

The terms "outer" or "outer layer" or "skin" or "skin layer" as used herein means a layer of a multi-layer film which comprises surface thereof.

The term "inner" or "inner layer" as used herein refers to a layer of a multi-layer film which is not a skin or outer layer of the film.

The term "core" or "core layer" as used herein refers to an inner layer of a multi-layer film having an odd number of layers wherein the same number of layers is present on either side of the core layer.

The term "intermediate" or "intermediate layer" as used herein refers to an inner layer of a multi-layer film which is positioned between a core layer and an outer layer of said film.

The term "palindromic" film as used herein refers to a multi-layer film, the layer of which is substantially symmetrical. Examples of palindromic films would be film having the following layer configurations A/B/A, or A/B/B/A or A/B/C/B/A, etc. An example of a non-palindromic film is a A/B/C/A.

As used herein and unless otherwise specifically indicated, the term "cross-linking" refers to either irradiating the extruded film as described in the detailed description of the invention or suitably additivating the polymers to be extruded so that the desired degree of cross-linking is achieved in the extruded film.

As used herein the term "polyolefin" refers to thermoplastic polymers obtained by polymerization or copolymerization of relatively simple ($C_2$–$C_{12}$) olefins which may contain other comonomers wherein the olefin units are however present in higher amounts with respect to the other comonomers; including, but not limited to, homopolymers, copolymers, terpolymers blends and modifications of such relatively simple olefins.

Are specifically included therein homopolymers such as polyethylene and polypropylene, copolymers such as propylene copolymers, ethylene-alpha-olefin copolymers, ethylene-vinyl-acetate copolymers, and ethylene-acrylate or ethylene-metacrylate copolymers.

The term "polyethylene" as used herein refers to a family of resins obtained by polymerizing the gas ethylene, $C_2H_4$. By varying the catalysts and methods of polymerization, properties such as density, melt index, crystallinity, degree of branching and molecular weight distribution can be regulated over wide ranges.

Polyethylenes having densities below about 0.925 g/cm$^3$ are called low density polyethylenes (LDPE), those having densities ranging from about 0.926 g/cm$^3$ to about 0.940 g/cm3 are called medium density polyethylene (MDPE) and those having densities ranging from about 0.941 g/cm to about 0.965 g/cm and over are called high density polyethylenes (HDPE).

The molecular structure of conventional LDPE is highly branched. While conventional MDPE possess a molecular structure which is branched, the degree of branching is less than that of conventional LDPE. The molecular structure of HDPE possesses little or no side branching.

The term "polypropylene" refers to a thermoplastic resin obtained by homopolymerizing propylene units according to known processes. The term "propylene copolymers" refers to a propylene copolymer with ethylene and/or butene-1 wherein the propylene units are present in a higher amount than the ethylene and/or butene-1 units. The term "ethylene-alpha-olefin copolymer" refers to a copolymer of ethylene with one or more ($C_4$–$C_{12}$)alpha-olefin preferably selected from the group comprising the linear copolymers or terpolymers of ethylene with 1-butene, 4-methyl-l-pentene, 1-hexene, and 1-octene. In particular, as used, herein linear low density polyethylene (LLDPE) has a density usually in the range of from about 0.915 g/cm$^3$ to about 0.925 g/cm$^3$; linear medium density polyethylene (LMDPE), as defined herein, has a density usually in the range of from about 0.926 g/cm$^3$ to about 0.941 g/cm$^3$; while very low density polyethylene, (VLDPE), as used herein, has a density lower than 0.915. The melt flow index of linear low, medium and very low density polyethylenes generally ranges from between about 0.1 to about 10 grams for ten minutes, preferably from about 0.5 to about 3.0 grams for ten minutes. Linear low, medium and very low density polyethylene resins of this type are commercially available or can be manufactured by known methods.

Said terms also include-the so-called metallocene (or single-site or constraint-geometry) linear polyethylenes having a density within the above indicated ranges.

The term "ethylene vinyl acetate copolymer" (EVA) as used herein refers to a copolymer formed from ethylene and vinyl acetate monomers wherein the ethylene derived units in the copolymer are present in major amounts and the vinyl acetate derived units in the copolymer are present in minor amounts.

As used herein, the term "ethylene-acrylate or ethylene-methacrylate copolymer" refers to the product obtained by copolymerization of ethylene with acrylate monomers of formula

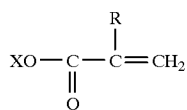

wherein R is hydrogen or a methyl group and X is hydrogen, $(C_1-C_4)$alkyl or a metal cation, preferably selected from $Na^+$ and $Zn^{++}$, wherein the ethylene units are present in a higher amount than the acrylate units.

All compositional percentages used herein are calculated on a "by weight" basis.

Density should be measured at 23° C. and in accordance with ASTM D 1505-68 (reapproved 1979).

Free shrink should be measured in accordance with ASTM D 2732.

Shrink tension and orientation release stress should be measured in accordance with ASTM D 2838-81.

The tensile properties of the film should be measured in accordance with ASTM D 882-81.

The elongation properties of the film should be measured in accordance with ASTM D 638.

The haze and luminous transmittance of the film should be measured in accordance with ASTM D 1003-61 (reapproved 1971).

The specular gloss of the film should be measured in accordance with ASTM D 2457-70 (reapproved 1977).

The tear propagation of the film should be measured in accordance with ASTM D 1938-67 (reapproved 1978).

The impact resistance of the film should be measured in accordance with ASTM D 3420-80.

One method of determining whether a material is "cross-linked" is to reflux the material in boiling toluene or zylene, as appropriate, for forty (40) hours. If a weight percent residue of at least 5 percent remains, then the material is deemed to be cross-linked. A procedure for determining whether a material is cross-linked is to reflux 0.4 g of the material in boiling toluene or another appropriate solvent, for example xylene, for twenty (20) hours. If no insoluble (gel) remains, the material may not be cross-linked. However, this should be confirmed by the "melt-flow" procedure below. If, after twenty (20) hours of refluxing insoluble residue (gel) remains the material is refluxed under the same conditions for another twenty (20) hours. If more than 5 weight percent remains upon conclusion of the second refluxing the material is considered to be cross-linked. Preferably at least two replicates are utilized.

Another method whereby cross-linking and the degree of cross-linking can be determined is by ASTM D 2765-68 (Reapproved 1978). Yet another method for determining whether a material is cross-linked is to determine the melt-flow of the material in accordance with ASTM D 1238-79 at 230° C. and while utilizing a 21,600 gram load. Materials having a melt flow of greater than 75 grams for ten minutes are deemed non-cross-linked. This method should be utilized to confirm the "gel" method described above whenever the remaining insoluble residue (gel content) is less than 5% by weight, since some cross-linked materials will evidence a residual gel content of less than 5 weight percent. If the cross-linking is accomplished by irradiation of the film the amount of ionizing radiation which has been absorbed by a known film material can be calculated by comparing the weight percent of insoluble material (gel) remaining after refluxing the sample to the weight percent of gel remaining after refluxing standards of the same material which have been irradiated to different known degrees. The experts in the field also recognize that a correlation exists between the amount of ionizing irradiation absorbed and the melt flow of material. Accordingly, the amount of ionizing irradiation which a material has absorbed may be determined by comparing the melt flow of the material to the melt flow of the samples of the same material which have been irradiated to different known degrees.

The term "gauge" is a unit of measure applied to the thickness of film or the layers thereof. 100 gauge is equal to 1 ml, which is one thousandth of an inch (1 inch=2.54 cm).

A rad is the quantity of ionizing radiation that results in the absorption of 100 ergs of energy per gram of a radiated material, regardless of the source of the radiation (1 rad= $10^{-2}$ Gy). A megarad is $10^6$ rads (MRad is the abbreviation for megarad).

SUMMARY OF THE INVENTION

It has now been found a process for the manufacture of multi-layered heat-shrinkable cross-linked polyolefin films containing recycle scraps of the same film.

Particularly it has been found that, by recycling scraps of cross-linked multilayer heat-shrinkable polyolefin films in an inner layer of the same film, a film is obtained which has physical properties and packaging performances almost comparable to those of the virgin film.

In a general embodiment the process of the present invention comprises the steps of:

a) coextruding a multilayer polyolefin film in the form of a "tape";

b) cross-linking it; and c) orienting said irradiated tape into a heat-shrinkable film, characterized in that scrap material produced in the manufacture or in the further processing to finished articles of cross-linked films of this same structure is recycled into said step a).

OBJECTS OF THE PRESENT INVENTION

Accordingly, it is a general object of the present invention to provide a process for the manufacture of cross-linked heat-shrinkable polyolefin films comprising the recycling of scraps of said cross-linked film.

Another object of the present invention is to provide a cross-linked heat-shrinkable polyolefin film suitable for packaging food and non-food goods.

A further object of the present invention is to provide packaging material, for example bags, pouches, comprising a film obtained according to the process herein disclosed.

The process according to the present invention provides several advantages when compared to the processes of prior art. Firstly, the present invention allows to recycle scraps of cross-linked films, which recycling was taught to be impossible by prior art. Another advantage is in that the so obtained film has constant qualitative characteristics, comparable to the virgin film.

Both on-line and off-line recycling techniques may be used in the process according to the present invention.

DETAILED DESCRIPTION OF THE INVENTION

The present invention relates to a process of manufacturing heat-shrinkable multi-layer cross-linked polyolefin films characterized in that one or more of the inner layers of said films contain recycle cross-linked polyolefin scraps.

The process of the present invention is a conventional process of manufacturing heat-shrinkable multi-layered polyolefin films, as disclosed in the above cited prior art.

Every method of recycling scraps available in the art is suitable for the process of the invention.

According to the invention, the multilayered film is composed of at least three layers comprising one core layer sandwiched between two outer layers. The film can be a palindromic film, with the two outer layers one equal to the other, or can be asymmetric with the two outer layers different one from the other.

When a number of layers of more than three layers is provided in the film, the core layer is herein intended as the central core of the multi-layered structure.

In a typical embodiment of the present invention the process begins by blending, if and as necessary, the raw materials (i.e. the polymeric resins) in the proportions and ranges according to the desired film. The resins are usually purchased from a supplier in pellet form and can be blended in anyone of a number of commercially available blenders as is well known in the art. During the blending process any conventional additives and/or agents which are desired to be utilized are also incorporated. The additives may be incorporated by utilizing a masterbatch containing small percentages of the additives.

Additives which can conventionally be used include antifog, antioxidant, antistatic, slip and anti-block agents, thermal stabilizers, U.V. stabilizers, organic and inorganic pigments, and the like agents. Preferred anti-block agents are diatomaceous silica ($SiO_2$, which is available for example from Mc Cullogh Benton, Inc.) and synthetica silica such as those manufactured and marketed by W. R. Grace Davison Division under the trade name Syloid or Sylobloc. A preferred slip agent is erucamide (available from Humko Chemical). Other slip agents such as steraramide (available from Humko Chemical), behenamide N,N'-dioleylethylenediamine (available from Glyco Chemical) may be utilized. A preferred antioxidant and thermal stabilizing agent is tetrakis [methylene 3-(31 5'-di-t-butyl-4'-hydroxyphenyl)propionate]methane (available from Ciba-Geigy). Suitable antifog agents are polyoxyethylene sorbitan esters, glycerol fatty acid esters, and polyoxyethylene alkyl esters such as those commercially available under the trade names Atmer. Preferred antistatic agents are polyoxyethylene amines (such as Atmer 163) or polyoxyethylene fatty alchols (e.g. Atmer 178).

The resins and applicable additives and/or agents are then fed to the hoppers of extruders which feed a coextrusion die. Depending on the structural architecture of the multi-layer film, the number of extruders will be determined by the expert in the field. When extruding through a round die, the materials are coextruded as a relatively thick tube or "tape" which has an initial diameter and thickness dependent upon the diameter and die gap of the coextrusion die. If desired, a fine mist of a silicone or anti-fog spray may be applicated to the interior of the freshly extruded tubolar material to further improve processability of the tubular material, as disclosed, for example in EP-A-0071349. The final diameter and thickness of the tubular film is dependent upon the racking ratio, i.e. the stretching ratio. As an alternative to tubular coextrusion, slot dies, could be used to coextrude the material in sheet (or tape) form. Well-known single or multi-layer extrusion coating processes could also be utilized, if desired. Exemplary of this method is U.S. Pat. No. 3,741,253.

When cross-linking is achieved chemically a suitable amount of cross-linking agents (e.g. peroxides) is added to the polymers to be extruded and no specific additional step is required.

When, according to a preferred embodiment of the invention, cross-linking is achieved by irradiation, said step is carried out after extrusion by bombarding the film in its "tape" or unexpanded tubing or sheet form with high-energy electrons from an accelerator. Irradiation may be accomplished by the use of high-energy radiation using electrons, which is the preferred radiation, but X-rays, -gama rays, beta rays, etc. can also be used. The electron irradiation: source can be a Van der Graaf electron accelerator, e.g. one operated, rated, for example at about 2,000,000 volts, with a power output of about 500 watts.-Alternatively, there can be employed other sources of high energy electrons such as the General Electric 2,000,000 volt resonant transformer or the corresponding 1,000,000 volt, 4 kilowatt, resonant transformer. The voltage can be adjusted to appropriate levels which may be, for example, 1,000,000 or 2,000,000 or 3,000,000 or 6,000,000 or higher or lower. Other apparatus for irradiating films are known to those expert in the field. The irradiation is usually carried out at between 1 megarad and 12 megarad. Preferably irradiation is carried out at between about 1 and about 6 MRad. Most preferably between about 1 and about 4 MRad. Irradiation can conveniently be carried out at room temperature, although higher and lower temperatures, as for example, from 0° C. to 60° C. may be employed.

In the next step, the film is reheated to its orientation temperature range and oriented with a well-known orienting technique. For example, the heated film is inflated, by application of internal air pressure, into a bubble thereby transforming the narrow tape with thick walls into a wide film with thin walls of the desired film thickness and width. This process is sometimes referred as "trapped bubble technique" or "racking". The degree of inflation and subsequent stretching is often referred to as the "racking ratio" or "stretching ratio". After stretching, the tubular film is then collapse into a superimposed lay-flat configuration and wound into rolls often referred to as "mill rolls".

Films scraps, which, as seen before, may be generated at different stages of the-overall process, are gathered, suitably comminuted and recycled. Film scrap can be recycled in any and in more than one of the inner layers of the original film structure or inner layer(s) of recycle film can be newly formed in the recycle containing film by dedicating one or more extruders to melt process the recycle scrap and coextrude the recycle layer(s) along with the coextrusion of the original multilayer structure.

The amount of film scrap in the recycle layer(s) may range from 5 to 100% by weight of the layer(s) total weight.

The proportion of the scrap multilayer cross-linked film which may globally be incorporated into the inner layer(s) is however up to about 50% by weight over the film total weight.

In case of a three layer original structure, in one preferred embodiment, scrap is recycled into the core layer, blended with virgin core polymer in amounts generally up to 75% of the core overall weight, preferably up to 50% and more preferably up to 35%.

In an alternative preferred embodiment two intermediate layers, between the core and the outer layers are formed entirely of recycle scrap by dedicating one or two additional extruders to the melt processing of said recycle scrap and giving rise to an increase in the overall number of layers from 3 of the virgin structure to 5 in the recycle-containing one.

In this case the core layer may also contain part of cross-linked film scrap blended with virgin polymer.

In still another alternative embodiment, in the recycle-containing structure the core layer can be splitted into two layers and in between a new layer entirely composed of recycle scrap can be coextruded.

Also in this case recycle scrap can also be added in the other inner layers blended with virgin polymer.

Analogously, in the case of films containing more than three layers, film scrap may be recycled in one or more inner layers, in percent by weight of from 5 to 100% of the weight of the layer(s) and/or additional layer(s) of film scrap can be formed up to a maximum total recycle of about 50% of the film weight.

Preferably, in the case of a five layer film structure, the film scrap will be recycled in the core and/or in the two intermediate layers in a balanced amount. For recycling, scraps are either pre-blended with the virgin material of the inner layer(s) or directly added into the selected extruders.

The scrap material which may be added up to a maximum amount of 50% w/v of the total structure, is preferably added up to 35% and more preferably up to 25% of the total structure.

The process of the present invention is generally applicable to multi-layers heat-shrinkable cross-linked polyolefin films.

Examples of said films may be found in EP-A-0 561 428, published 22.09.93, U.S. Pat. No. 4,551,380, published Nov. 5, 1985, all in the name of the applicant; U.S. Pat. No. 4,865,902 assigned to E. I. Du Pont de Nemours and Company. In the above films the outer layers are mainly composed of low density polyethylene, medium density polyethylene, high density polyethylene, linear low density polyethylene, linear medium density polyethylene, very low density polyethylene, ethylenevinyl acetate copolymers or of blends thereof.

DESCRIPTION OF THE PREFERRED EMBODIMENTS

According to the process of the present invention, a heat-shrinkable film was manufactured recycling scraps of the same film in the core of the manufactured film.

Particularly, the process of the present-invention is applied to an oriented, heat-sealable, cross-linked, multi-layer film comprising:

a core layer, consisting essentially of a LLDPE; and two outer layers each comprising a three component blend of (1) a LLDPE, (2) a LMDPE, (3) an EVA copolymer.

This multi-layer film is disclosed in U.S. Pat. No. 4,551,380, issued Nov. 5, 1985 and assigned to the applicant.

A more preferred embodiment is represented by embodiments I, II and III, disclosed in the above U.S. Pat. No. 4,551,380; embodiment II being the most preferred herein.

A standard film (Film A) was prepared according to embodiment II of the disclosure of U.S. Pat. No. 4,551,880. Said film was irradiated at an average MRad of about 2.0±0.5 MR.

Estrusions were carried out to incorporate recycled Film A scraps in the standard structure. The scraps were pelletized and blended off-line with the virgin core polymer.

Accordingly, four films containing scraps were prepared: the first containing 10% of recycled scraps in the core (referred to as Film B); the second containing 5% of recycled scraps in the core (referred to as Film C) the third containing 10% of recycled scraps in the skin (referred to as comparative Film D); the fourth containing 5% of recycled scraps in the skin (referred to as comparative Film E). Each of the four films was prepared with a thickness of 15 and 19 μm, respectively.

The four films were examined as to their optical properties in comparison with standard film A (hereinafter abbreviated as STD).

The results are shown in the following Table 1.

TABLE 1

| SAMPLE | COMP. FILM D | COMP. FILM E | FILM B | FILM C | STD |
|---|---|---|---|---|---|
| HAZE % | 6.7 | 5.3 | 2.8 | 2.9 | 2.6 |
| GLOSS (i = 60 degrees) gloss units | 103 | 111 | 133 | 130 | 135 |

As shown in the above table, only Film B and Film C, namely the films containing recycled scraps in their core layer, have good optical properties, suitable for use in packaging for display purposes.

An evaluation of the shrink quality of the films was performed. The evaluation was carried out on packs made with a Gramegna semiauto L-sealer. The packs were shrunk in a Sitma tunnel at different temperatures. The samples were compared to STD which showed a good shrink quality at 180° C.

The following tests were carried out only on Film B and Film C.

A physical characterization was carried out. Tables 2 and 3 report the qualitative results.

TABLE 2

Physical evaluation
Film B/Film C (15 micron) vs STD

| | |
|---|---|
| Modulus: | Both are similar and higher than STD. |
| Tensile strength: | Similar to STD. |
| Elongation: | Higher than STD. |
| Tear properties: | Tear propagation and initiation resistance are higher than STD |
| Kinetic coefficient of friction: (Dynamic) | Lower for film to film conditions and equivalent for film to metal conditions. STD stress conditions: similar to |
| Trim seal strength: | STD. High stress conditions: higher than STD. |

TABLE 3

FILM B/FILM C (19 micron) vs STD

| | |
|---|---|
| Modulus: | Similar to STD. |
| Tensile strength: | Similar for L direction and slightly lower for T direction than STD. |
| Elongation: | Slightly lower than STD. |
| Tear properties: | Tear propagation is quite similar to STD. Tear initiation is lower in both directions for Film B. Film C is equivalent in TD and slightly lower in LD. |
| Free shrink: | No significant difference. |
| Shrink tension: | LD: higher than STD; TD: slightly higher for Film C. |
| Optics: | Haze and gloss are similar to STD |
| Tack: | No tack was detected for all the structures. |
| Kinetic coefficient of friction: (Dynamic) | Both film to film and film to metal conditions are similar to STD |
| Trim seal strength: | Considering STD and high stress |

TABLE 3-continued

FILM B/FILM C (19 micron) vs STD conditions, the results are
higher than STD.

The above results show that the physical properties of the films obtained according to the present invention have physical properties comparable to STD.

The sealability was evaluated on a Pulsar hot bar sealer at the following conditions:

| | |
|---|---|
| sealing time | 0.5 sec |
| sealing pressure | 2.0 bar set |
| | 1.5 bar actual |

Results are summarized in the following Table 4

TABLE 4

| FILM CODE | SEAL BEHAVIOUR (°C.) | | |
|---|---|---|---|
| | STICK | SEAL | MELT |
| Film B 15/μm | 115 | 120 | 150 |
| Film B 19/μm | 120 | 125 | 175 |
| Film C 15/μm | 115 | 120 | 150 |
| Film C 19/μm | 120 | 125 | 175 |

The heat seal range for MR 15 and 19 micron is 125–165° C.

The shrink range was evaluated using cardboard boxes packed on a Gramegna semiauto L-sealer.

The packs were then shrunk in a Sitma tunnel at different temperatures.

The samples were compared with STD.

| Film Code | | Shrink Range (°C.) | Burnt Through (°C.) |
|---|---|---|---|
| Film B | 15/μm | 150–200 | 210 |
| Film B | 19/μm | 150–210 | 220 |
| Film C | 15/μm | 150–200 | 210 |
| Film C | 19/μm | 150–210 | 220 |
| STD | 15/μm | 140–200 | 210 |
| STD | 19/μm | 150–210 | 220 |

The results show no significant difference among the formulations evaluated, the shrink range is wider for 19 micron films (60° C. vs 50° C.).

The packaging appearance was evaluated on the samples packed as described above.

The samples were compared to STD which showed "good" shrink qualities.

At 180° C., no difference was noticed between the experimental formulations and STD.

As to optical properties after shrink, STD performed slightly better than Film B and Film C, which appeared to be less glossy.

The samples tested performed similarly to STD, with respect to the trim sealing properties, heat seal range and shrink range.

From the above results, it can be seen that the process of the present invention allows to obtain heat shrinkable irradiated films containing recycle scrap of the same film. The film obtainable from the process herein disclosed has physical and packaging characteristics which make it comparable to standard films.

Therefore, packaging materials comprising a film obtainable by the process herein disclosed are within the frame of the present invention.

It should be understood that the detailed description and specific examples which indicate the presently preferred embodiments of the invention are given by way of illustration only, since various changes and modifications within the spirit and scope of the invention will become apparent to those of ordinary skill in the art upon review of the above detailed description and examples.

What is claimed is:

1. A multilayer, cross-linked, heat-shrinkable film comprising:

a) at least one inner layer comprising thermoplastic polymer; and b) two outer layers comprising thermoplastic polymer different from the thermoplastic polymer of said at least one inner layer;

characterized in that cross-linked scrap material produced in the manufacture of the heat shrinkable film is incorporated into at least one of the inner or outer layers in an amount up to 50% by weight of the total film weight.

* * * * *